United States Patent [19]

Yanagawa et al.

[11] Patent Number: 5,583,958
[45] Date of Patent: Dec. 10, 1996

[54] COMPOSITE OPTICAL DEVICE

[75] Inventors: Hisaharu Yanagawa; Takeo Shimizu; Shiro Nakamura, all of Tokyo; Shinichi Furukawa, Mito, all of Japan

[73] Assignees: The Furukawa Electric Co., Ltd.; Nippon Telegraph and Telephone Corporation, both of Tokyo, Japan

[21] Appl. No.: 532,418

[22] Filed: Sep. 22, 1995

[30] Foreign Application Priority Data

Sep. 28, 1994 [JP] Japan .................................. 6-233534

[51] Int. Cl.$^6$ .................................................... G02B 6/36
[52] U.S. Cl. .............................. 385/24; 385/45; 385/14; 385/60; 385/49; 385/46
[58] Field of Search ................................ 385/24, 17, 20, 385/45, 14, 50, 132, 56, 60, 65, 49, 46

[56] References Cited

U.S. PATENT DOCUMENTS

| | | | |
|---|---|---|---|
| 5,400,421 | 3/1995 | Takahashi | 385/45 |
| 5,487,122 | 1/1996 | Ota | 385/45 |

FOREIGN PATENT DOCUMENTS

| | | |
|---|---|---|
| 0591941 | 4/1994 | European Pat. Off. . |
| 2-234113 | 9/1990 | Japan ........................ 385/17 |
| 2184255 | 6/1987 | United Kingdom . |
| 2271682 | 4/1994 | United Kingdom . |

*Primary Examiner*—John Ngo
*Attorney, Agent, or Firm*—Frishauf, Holtz, Goodman, Langer & Chick

[57] ABSTRACT

A composite optical device has a first and second chips. The first chip has a substrate on which M pieces of optical waveguides for transmitting communication light, N pieces of optical waveguides for transmitting monitoring light and M-input/N-output star couplers are formed in an integrated form, and the second chip has a substrate on which N pieces of optical waveguides for transmitting communication light, N pieces of optical waveguides for transmitting monitoring light and N pieces of 2-input/2-output star couplers are formed in an integrated form. A first and second blocks holding optical fibers are joined respectively to the first and second chips. When the composite optical device in which the first and second blocks and the first and second chips are joined is incorporated into the optical communication system, a passive double star system is constructed. By using an MT connector instead of the first block and the first chip, a single star system can be rapidly constructed.

15 Claims, 13 Drawing Sheets

COMPOSITE OPTICAL DEVICE

BACKGROUND OF THE INVENTION

1. Field of the Invention

The present invention relates to an optical device for use in an optical fiber communication system, and more particularly, to a composite optical device which is applicable to both a single star system and a passive double star system.

2. Description of the Prior Art

In a communication system, for example, a telephone network, an optical fiber line (hereinafter referred to simply as an optical fiber) is sometimes used as a transmission line for connecting equipment at telephone office to terminal equipment of subscribers. As such an optical fiber communication system, a single star system is known in which pieces of terminal equipment are connected to office equipment with use of optical fibers exclusive for respective terminal equipment.

As shown in FIG. 1, in the single star system, office equipment A1 to An is connected to subscribers' equipment B1 to Bn via optical fibers L1 to Ln exclusive for the respective terminal equipment B1 to Bn. Transmission light λ1 is sent from the office equipment A1 to An to the terminal equipment B1 to Bn via the exclusive optical fibers L1 to Ln. As the single star system is simply constituted, operation management of the system is relatively easy. Moreover, the single star system has an advantage that information capacity per subscriber is large and that crosstalk will hardly occur. On the other hand, the single star system has a disadvantage that system construction cost is high. Therefore, at the present, the single star system is mainly offered for the service for business users.

As another optical fiber communication system, a passive double star system is known. As shown in FIG. 2, the passive double star system has an optical coupler/splitter E of an M-input/N-output (M and N are integral numbers and M <N) interposed between the office equipment A (corresponding to A1 to An in FIG. 1) and the subscribers' terminal equipment B1 to Bn. In this system, the office equipment can be connected to the optical coupler/splitter E with M pieces of optical fibers Le1 to Lem, less than N, the number of pieces of terminal equipment stalled, and hence the system construction cost can be reduced. In FIG. 2, symbols r1 to rn represent branching/coupling terminals of the optical coupler/splitter E on t he terminal equipment side. The terminals r1 to rn are respectively connected to the subscribers' terminal equipment B1 to Bn via the optical fibers L1 to Ln.

By the way, it is necessary to search or locate a fault where characteristics of an optical fiber deteriorate, so that a proper action can be taken when mechanical or transmission characteristics of the optical fiber deteriorate in the optical communication system. For this fault search (monitoring of optical fiber line), an optical fiber line monitoring and testing device such as an OTDR (optical time domain reflectometer) using a back-scattering method is utilized. With a typical OTDR, an optical output pulse (monitoring light) from a semiconductor laser is led to an optical fiber to be measured, and back-scattered light which was scattered and returned in the reverse direction from the optical fiber is detected to measure a loss of the optical fiber.

The single star system having the fault search function is constituted, for example, as shown in FIG. 3. Also, the passive double star system having a similar function is shown in FIG. 4. In FIGS. 3 and 4, N pieces of optical fibers S for sending monitoring light are connected to an optical fiber line monitoring and testing device D. The monitoring light λ2 propagating in each of the optical fibers S is led to a corresponding one of the optical fibers L1 to Ln of the optical communication system through a corresponding one of optical couplers C1 to Cn.

As mentioned above, the passive double star system has an advantage that the system can be constructed with a low cost, for example, a half of the construction cost of the single star system. On the other hand, it has disadvantages that the cost for system operation management is high, information capacity per subscriber is small, and crosstalk will easily occur.

At the present, only the services with lower charges and smaller information capacity such as telephone, low-speed data, broadcasting and distributing images are offered for general home users. Thus, from the short-term and economic viewpoint, it is desirable for the service for general home users to construct a passive double star system. In the meantime, it is expected that various information services via B-ISDN (Broadband-Integrated Services Digital Network) will be offered for general home users in the future. However, it is hard to offer such information services through the passive double star system. Therefore, it is more desirable to construct a single star system first from the longer term point of view.

As already explained referring to FIGS. 1 to 4, the single star system and the passive double star system are different in basic construction. Thus, in order to construct the single star system shown in FIG. 3 after construction of the passive double star system shown in FIG. 4, it is necessary to eliminate connection between the optical coupler/splitter E and the optical fibers Le1 to Lem and the connection between the optical coupler/splitter E and the optical fibers L1 to Ln in FIG. 4 and to remove the optical coupler/splitter E from between the office equipment A and the subscribers' terminal equipment B1 to Bn and moreover to connect the optical fibers L1 to Ln to the office equipment A1 to An as shown in FIG. 3. In this way, it requires cost and labor to construct the single star system after construction of the passive double star system.

SUMMARY OF THE INVENTION

The object of the present invention is to provide a composite optical device which is applicable to both the single star system and the passive double star system.

The composite optical device of the present invention comprises a first chip having an inner end face and an outer end face and being formed with a first optical component in an integrated form, and a second chip having an inner end face and an outer end face and being formed with a second optical component in an integrated form. The first and the second chips are separate from each other and adapted to be removably joined to each other at the inner end faces of both the chips.

The first optical component includes M pieces of first optical waveguides for transmitting communication light, N pieces (N>M) of second optical waveguides for transmitting communication light, and a first optical coupler means for optically coupling corresponding ones of the first and the second optical waveguides. Each of the first optical wave guides has a first end exposed to the outer end face of the first chip. Each of the second waveguides has a first end exposed to the inner end face of the first chip.

The second optical component includes N pieces of third optical waveguides for transmitting communication light.

Each of the third optical waveguides has a first end exposed to the inner end face of the second chip. When the first chip and the second chip are joined to each other, corresponding ones of the first ends of the second optical waveguides and the first ends of the third optical waveguides are aligned with each other.

The composite optical device of the present invention has an advantage that it can be applied to both the single star system and the passive double star system.

That is, the passive double star system is constructed by incorporating the composite optical device of the present invention in which the first chip and the second chip are joined to each other into the optical fiber communication system. In this passive double star system, when the communication light from the office equipment enters one of the M pieces of the first optical waveguides through the optical fiber concerned, the communication light can propagate to the N pieces of subscribers' terminal equipment through the first optical waveguide, the first optical coupler means, the N pieces of the second optical waveguides, the N pieces of the third optical waveguides and the optical fibers connected respectively to the third optical waveguides. Thus, the communication light can be transmitted between the office equipment and an arbitrary subscriber's terminal equipment.

In the meantime, the single star system is constructed by incorporating the composite optical device in which the first chip is detached from the second chip into the optical fiber communication system. In this single star system, when the communication light from the office equipment enters one of the N pieces of the third optical waveguides through the optical fiber concerned, the communication light propagates to a corresponding one of the N pieces of subscribers' terminal equipment through the third optical waveguide and the optical fiber connected thereto. Thus, the communication light can be transmitted between the office equipment and an arbitrary subscriber's terminal equipment.

Therefore, by using the composite optical device of the present invention, the passive double star system can be constructed with low cost. Moreover, even after construction of the passive double star system, the single star system which can offer various information services can be constructed by removing the first chip from the composite optical device. That is, the passive double star system can be changed to the single star system easily, rapidly and with low cost.

Preferably, the first optical component includes N pieces of fourth optical waveguides for transmitting monitoring light. Each of the fourth optical waveguides has a first end exposed to the inner end face of the first chip, and a second end exposed to the outer end face of the first chip. The second optical component includes N pieces of fifth optical waveguides for transmitting monitoring light, and a second optical coupler means for optically coupling corresponding ones of the third optical waveguides and the fifth optical waveguides. Each of the fifth optical waveguides has a first end exposed to the inner end face of the second chip. When the first chip and the second chip are joined to each other, corresponding ones of the first ends of the fourth optical waveguides and the first ends of the fifth optical waveguides are aligned with each other.

The composite optical device according to this preferred embodiment has an advantage that it can be applied to both the passive double star system having a fault search function and the single star system having a fault search function.

More specifically, by incorporating the composite optical device in which the first chip and the second chip are joined to each other into the optical fiber communication system, the passive double star system having a fault search function is constructed. That is, when monitoring light from the optical fiber line monitoring and testing device enters one of the N pieces of the fourth optical waveguides through the optical fiber concerned, the monitoring light propagates, through the fourth optical waveguide, the fifth optical waveguide corresponding thereto, the second optical coupler means and that one of the third optical waveguides which corresponds to the fifth optical waveguide, to the optical fiber connected to the third optical waveguide. Thus, a fault in an arbitrary optical fiber can be searched.

In the meantime, by incorporating the composite optical device from which the first chip is removed into the optical fiber communication system, the single star system having a fault search function is constructed. That is, when the monitoring light from the optical fiber line monitoring and testing device enters one of N pieces of the fifth optical waveguide, the monitoring light propagates, through the fifth optical waveguide, the second optical coupler means and that one of the third optical waveguides which corresponds to the fifth optical waveguide, to the optical fiber connected to the third optical waveguide. Thus, a fault in an arbitrary optical fiber can be searched.

Preferably, the composite optical device further includes a first block for holding M pieces of first optical fibers for transmitting communication light (and N pieces of third optical fibers for transmitting monitoring light) in a state where one end of each of the first (and the third) optic fibers is exposed to the inner end face of the first block, and a second block for holding N pieces of second optical fibers for transmitting communication light (and N pieces of fourth optical fibers for transmitting monitoring light) in a state where one end of each of the second (and the fourth) optical fibers is exposed to the inner end face of the second block.

The first block is removably joined at its inner end face to the outer end face of the first chip. The second block is removably joined at its inner end face to the outer end face of the second chip. Each of the third and fifth optical waveguides has a second end exposed to the outer end face of the second chip.

When the first block holding M pieces of the first optical fibers (and N pieces of the third optical fibers) is joined to the first chip, one end of each of the first optical fibers is aligned with a corresponding one of the first ends of the first optical waveguides (and one end of each of the third optical fibers is aligned with a corresponding one of the second ends of the fourth optical waveguides). Also, when the second block holding N pieces of the second optical fibers (and N pieces of the fourth optical fibers) is joined to the second chip, one end of each of the second optical fibers is aligned with a corresponding one of the second ends of the third optical waveguides (also, on e end of each of the fourth optical fibers is aligned with a corresponding one of the second ends of the fifth optical waveguides).

According to the above preferred embodiment, by joining the first block holding the optical fibers to the first chip and by joining the second block holding the optical fibers to the second chip, the optical fibers can be connected to the composite optical device. Thus, the optical fiber communication system can be constructed rapidly, easily and accurately.

More preferably, the composite optical device further includes clamp means for removably clamping the first block, first chip, second chip and second block which are joined to one another. According to this preferred embodiment, the composite optical device can be assembled and disassembled rapidly and easily.

Preferably, the first optical component includes M pieces of sixth optical waveguides for transmitting monitoring light, and a third optical coupler means for optically coupling corresponding ones of the first optical waveguides and the sixth optical waveguides. Each of the sixth optical waveguides has a first end exposed to the outer end face of the first chip.

According to the preferred embodiment, when the monitoring light enters one of the sixth optical waveguides, the monitoring light propagates, through the sixth optical waveguide, the third optical coupler means and that first optical waveguide which corresponds to the sixth optical waveguide, to the optical fiber connected to the first optical waveguide. In this way, a fault can be searched in the optical fiber connected to an arbitrary first optical waveguide.

Preferably, the composite optical device further includes a guide pin for joining the first chip and the second chip to each other. The first chip is formed with a first guide hole which opens at the inner end face of the first chip and into which the guide pin is removably fitted. The second chip is formed with a second guide hole in alignment with the first guide hole. The second guide hole opens at the inner end face of the second chip, and the guide pin is removably fitted into the second guide hole. According to this preferred embodiment, the composite optical device can be assembled and disassembled rapidly and easily. Moreover, when the first chip and the second chip are joined to each other, both the chips can be positioned accurately.

DETAILED DESCRIPTION

Figure 1:
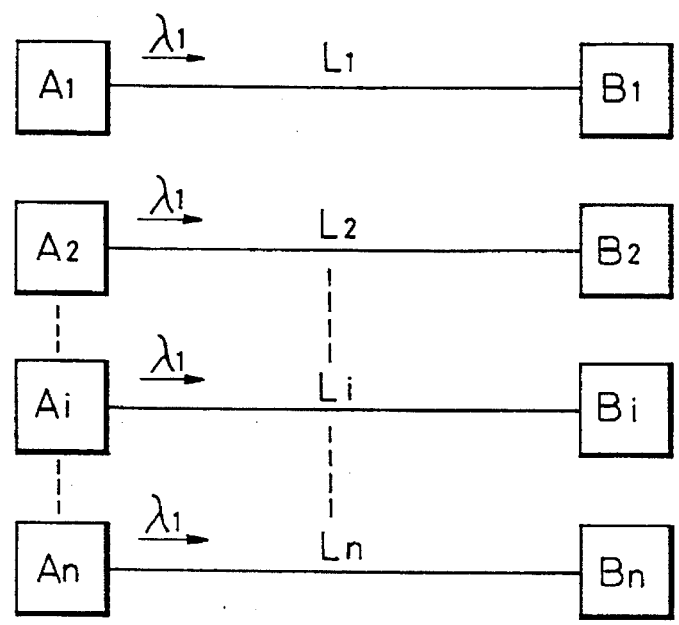
FIG. 1 is a schematic diagram showing a single star system.

A composite optical device according to a first embodiment of the present invention will be explained referring to FIG. 5.

This composite optical device has a first optical waveguide chip 1 and a second optical waveguide chip 2 (hereinafter, the elements 1 and 2 are referred to as first and second chips). The first and second chips 1 and 2 are removably joined to each other at their inner end faces 1b and 2a. The first chip 1 has a first optical component formed on a substrate in an integrated form, and the second chip 2 has a second optical component formed on a substrate in an integrated form.

The first optical component includes two pieces of first optical waveguides le1 and le2 for transmitting communication light, four pieces of second optical waveguides 11 to 14 for transmitting communication light, 2-input/4-output star coupler e interposed between the first optical waveguides and the second optical waveguides, and four optical waveguides s1 to s4 (hereinafter referred to as fourth optical waveguides) for transmitting monitoring light. Each of the first optical waveguides le1 and le2 has its one end exposed to an outer end face 1a of the first chip 1, and the other end connected to a corresponding one of input terminals a1 and a2 of the star coupler e. Also, each of the second optical waveguides 11 to 14 has its one end connected to a corresponding one of output terminals b1 to b4 of the star coupler e, and the other end exposed to the inner end face 1b of the first chip Moreover, both ends of each of the fourth optical waveguides s1 to s4 are exposed respectively to the outer end face 1a and the inner end face 1b of the first chip 1.

The second optical component includes four pieces of third optical waveguides 111 to 114 for transmitting communication light, four pieces of fifth optical waveguides ss1 to ss4 for transmitting monitoring light, and four 2-input/2-output optical couplers C1 to C4. In FIG. 5, symbols c1 and c2 indicate input terminals of each of the couplers C1 to C4, and symbols d1 and d2 denote output terminals of each of the couplers C1 to C4, respectively. Both ends of each of the third and fifth optical waveguides 111 to 114 and ss1 to ss4 are exposed respectively to the inner end face 2a and an outer end face 2b of the second chip 2. Each of the third optical waveguides l11 to l14 cooperates with a corresponding one of the fifth optical waveguides ss1 to ss4 to form a pair of optical waveguides. Each of the couplers C1 to C4 is provided at a corresponding one of four pairs of optical waveguides of l11, ss1; l12, ss2; l13, ss3; and l14, ss4.

Further, the composite optical device has a first optical fiber block 3 which is removably joined at its inner end face to the outer end face 1a of the first chip 1, and a second optical fiber block 4 which is removably joined at its inner end face to the outer end face 2b of the second chip 2 (hereinafter, the elements 3 and 4 are referred to as first and second blocks).

Figure 2:
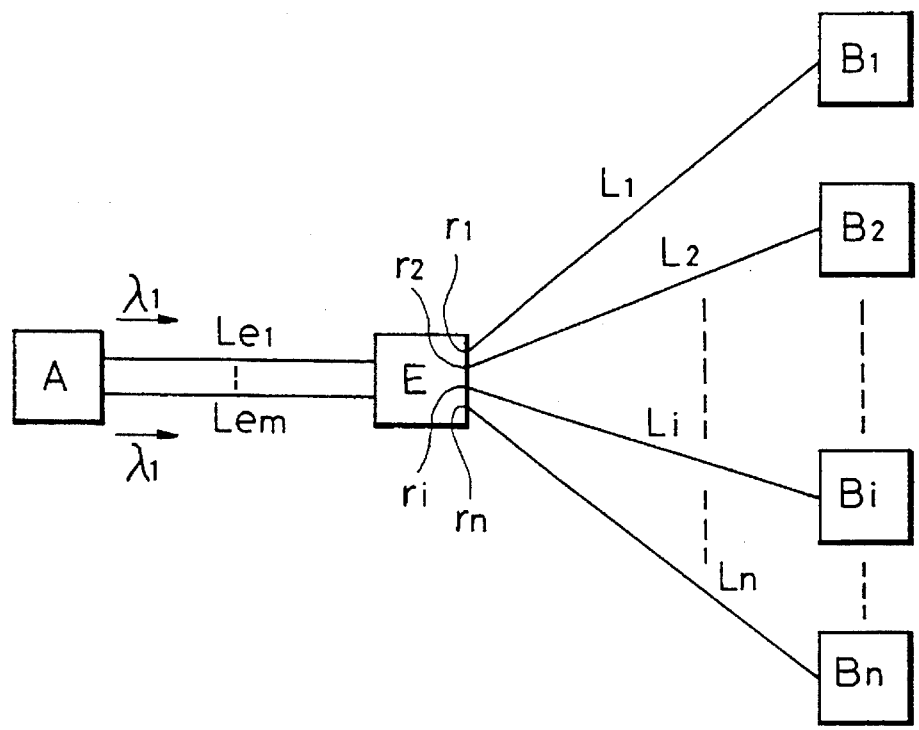
FIG. 2 is a schematic diagram showing a passive double star system.
Figure 3:
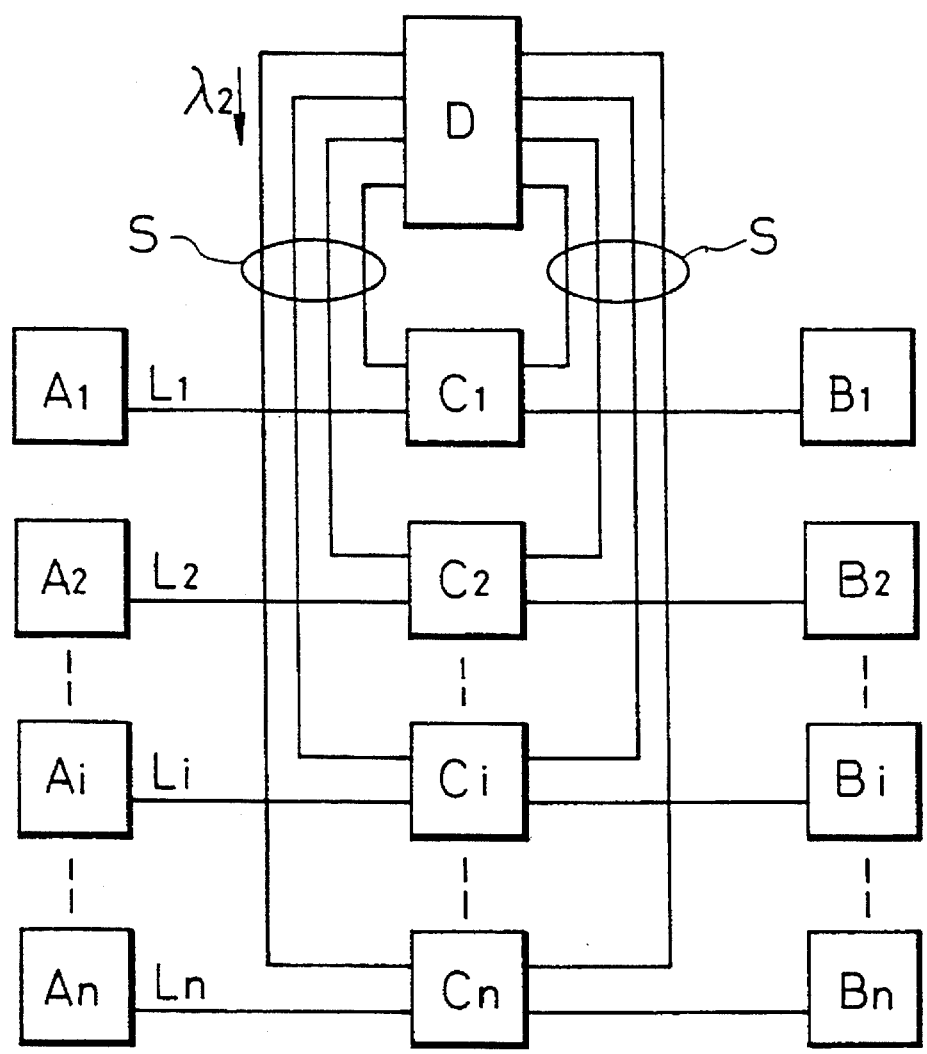
FIG. 3 is a schematic diagram showing a single star system having a fault search function.
Figure 4:
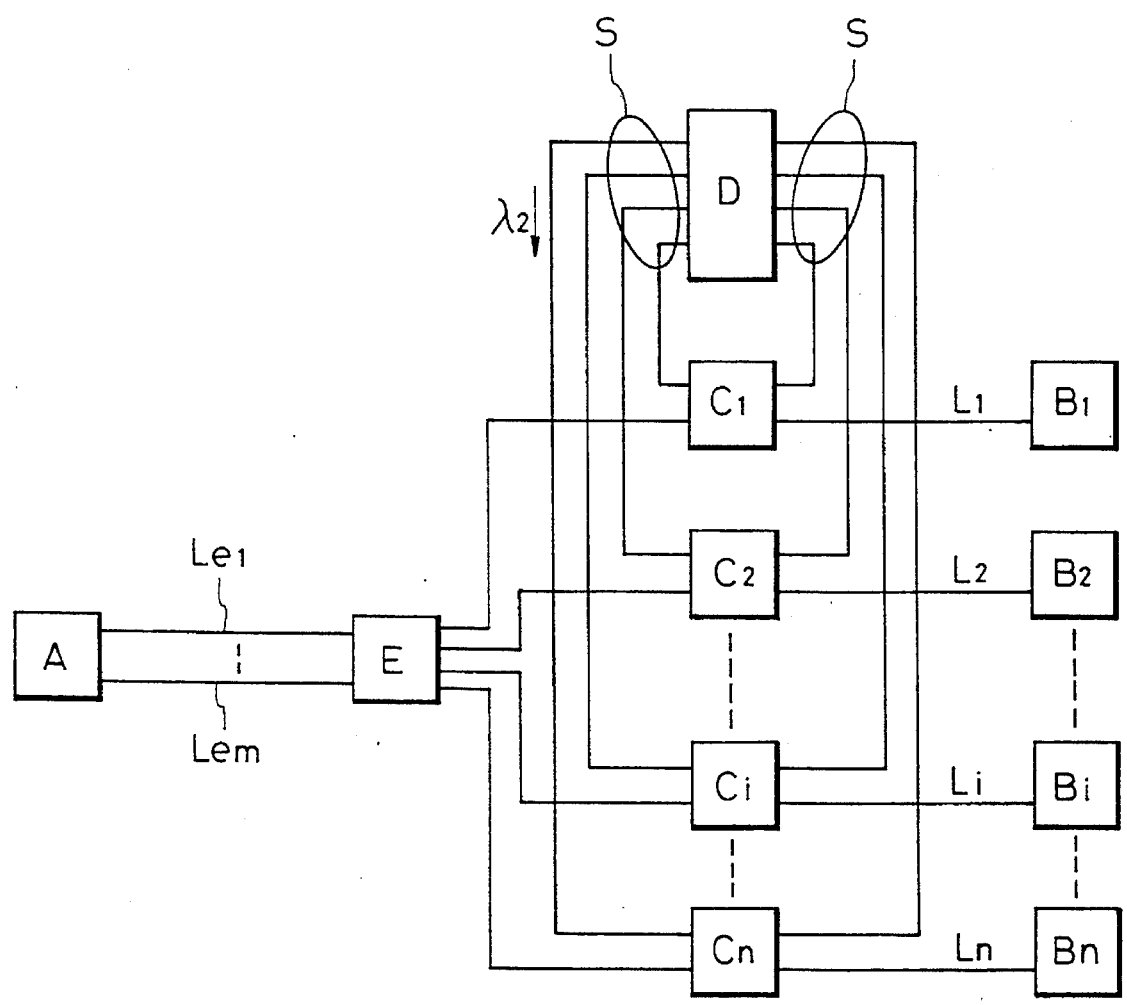
FIG. 4 is a schematic diagram showing a passive double star system having a fault search function.

The first block 3 holds two pieces of first optical fibers Le1 and Le2 for transmitting communication light, and four pieces of optical fibers (hereinafter referred to as third optical fibers) S1 to S4 for transmitting monitoring light. One end of each of the first optical fiber Le1 and Le2 is connected to an optical communication terminal in an optical office (corresponding to office equipment A shown FIGS. 2 and 4 (or office equipment A1 to An shown in FIG. 1 and FIG. 3)). The communication light $\lambda 1$ from the optical office is transmitted through the first optical fibers Le1 and Le2 to the composite optical device. One end of each of the third optical fibers S1 to S4 is connected to an optical fiber line monitoring and testing device D (FIG. 4). The monitoring light $\lambda 2$ from the testing device D is transmitted through the third optical fibers S1 to S4 to the composite optical device. The other end of each of the first and third optical fibers Le1, Le2 and S1 to S4 is exposed to the inner end face of the first block 3.

The second block 4 holds four pieces of second optical fibers L1 to L4 for transmitting communication light, and four pieces of fourth optical fibers SS1 to SS4 for transmitting monitoring light. One end of each of the second optical fibers L1 to L4 is connected to an optical communication terminal B on the subscriber side (corresponding to subscribers' terminal equipment B1 to Bn shown in FIGS. 2 and 4), and one end of each of the fourth optical fibers SS1 to SS4 is connected to the optical fiber line monitoring and testing device. The other end of each of the second and fourth optical fibers L1 to L4 and SS1 to SS4 is exposed to the inner end face of the second block 4.

In the composite optical device having the aforementioned construction, when the first chip 1 and the second chip 2 are joined to each other, corresponding ones of the opposing exposed ends of the second optical waveguides l1 to l4 and the third optical waveguides l11 to l14 are aligned with one another, and corresponding ones of the opposing exposed ends of the fourth optical waveguides s1 to s4 and the fifth optical waveguides ss1 to ss4 are aligned with one another. Also, when the first block 3 holding the first optical fibers Le1 and Le2 and the third optical fibers S1 to S4 is joined to the first chip 1, the exposed end of each of the first optical fibers Le1 and Le2 on the first block side is aligned with a corresponding one of opposing exposed ends of the first optical waveguides le1 and le2, and the exposed end of each of the third optical fibers S1 to S4 on the first block side is aligned with a corresponding one of the opposing exposed ends of the fourth optical waveguides s1 to s4. Moreover, when the second block 4 holding the second optical fibers L1 to L4 and the fourth optical fibers SS1 to SS4 is joined to the second chip 2, the exposed end of each of the second optical fibers L1 to L4 on the second block side is aligned with a corresponding one of the opposing exposed ends of the third optical waveguides l11 to l14, and the exposed end of each of the fourth optical fibers SS1 to SS4 is aligned with a corresponding one of the opposing exposed ends of the fifth optical waveguides ss1 to ss4.

The first optical fibers Le1 and Le2 are bundled together as one multi-conductor flat cable, whereby workability in connecting the office equipment to the first optical fibers is improved. In the meantime, for the convenience in connecting the first block 3 and the first optical fibers Le1 and Le2, the first optical fibers Le1 and Le2 are separated into a single-conductor cable on the first block side. It also applies to the second optical fibers L1 to L4, the third optical fibers S1 to S4 and the fourth optical fibers SS1 to SS4.

In the following, operation of the composite optical device of the first embodiment will be explained.

In constructing a passive double star system, a composite optical device (FIG. 5) obtained by joining the first block 3, the first chip 1, the second chip 2 and the second block 4 in this order is incorporated into the optical fiber communication system.

In this passive double star system, when the communication light $\lambda 1$ from the office equipment A enters the first optical waveguide le1 or le2 through the first optical fiber Le1 or Le2, the communication light $\lambda 1$ is led from the first optical waveguide le1 or le2 to the input terminal a1 or a2 of the star coupler e, and propagates from the output terminals b1 to b4 of the star coupler e to the second optical waveguides l1 to l4. Then, the communication light $\lambda 1$ propagates, through the third optical waveguides l11 to l14 and the second optical fibers L1 to L4, to the four subscribers' terminal equipment B. Thus, the communication light $\lambda 1$ from the office equipment A is transmitted to the subscriber's terminal equipment B which is in communication with the office equipment A.

When the monitoring light $\lambda 2$ from the optical fiber line monitoring and testing device D enters any one of the fourth optical waveguides s1 to s4 through a corresponding one o the third optical fibers S1 to S4, the monitoring light $\lambda 2$ propagates from this fourth optical waveguide s1, s2, s3 or s4 to the corresponding fifth optical waveguide ss1, ss2, ss3 or ss4, and then to the third optical waveguide l11, l12, l13 or l14 through the optical coupler C2, C2, C3 or C4. Further, the monitoring light $\lambda 2$ propagates to the second optical fiber L1, L2, L3 or L4 connected to the third optical waveguide. Therefore, by transmitting the monitoring light $\lambda 2$ from the testing device D to a desired one of the third optical fibers, a fault in an arbitrary second optical fiber can be searched.

In changing a passive double star system to a single star system, the first block 3 is taken out of the first chip 1. Then, an end of each of two pieces of optical fibers (not shown) for transmitting communication light different from the first optical fibers Le1 and Le2 is connected to the office equipment A, while the other end of each is connected to the first block 3. Both the fibers are held by the first block 3 in a state where their ends on the first block side are exposed to the inner end face of the first block 3 in alignment with the third optical waveguides l11 and l14 of the second chip. 2. Then, the first block 3 holding four pieces of optical fibers for transmitting communication light and four pieces of optical fibers S1 to S4 for transmitting monitoring light is joined at its inner end face to the end face 2a of the second chip 2. By doing this, the composite optical device in which the first chip 1 is detached from the second chip 2 is incorporated into the optical fiber communication system, to thereby construct a single star system.

When the communication light $\lambda 1$ from the office equipment A enters the third optical waveguide l11, l12, l13 or l14 through a corresponding one of the four optical fibers for transmitting communication light attached to the first block 3, the communication light λ1 propagates, through this third optical waveguide and the second optical fiber L1, L2, L3 or L4 connected thereto, to a corresponding one of the four subscribers' terminals B. That is, the communication light λ1 is transmitted from the office equipment A to the subscriber's terminal B.

When the monitoring light λ2 from the optical fiber line monitoring and testing device D enters the fifth optical waveguide ss1, ss2, ss3 or ss4 through the third optical fiber S1, S2, S3 or S4, the monitoring light λ2 propagates, through this fifth optical waveguide, the optical coupler C1, C2, 03 or C4 and the third optical waveguide l11, l12, l13 or l14, to the second optical fiber L1, L2, L3 or L4 connected to the third optical waveguide, whereby a fault is searched.

In the following, a composite optical device according to a second embodiment of the present invention will be explained referring to FIG. 6.

Compared to the optical device of the first embodiment adapted to search a fault only for the optical fibers on the subscriber's side with respect to the optical device, the optical device of this embodiment is characterized in that it can also make a search to locate a fault for the optical fibers on the office side with respect to the optical device. The optical device of this embodiment is equivalent to a combination of the optical device of the first embodiment and the below-mentioned additional elements. The other construction of the optical device of this embodiment is the same as that of the first embodiment. Hence, explanations on the constitution and operation will be partially omitted.

In the optical device of this embodiment, the first optical component formed on a first chip 1' includes two pieces of optical waveguides for transmitting monitoring light (hereinafter referred to as sixth optical waveguides) which cooperate with two pieces of the first optical waveguides le1 and le2 to constitute two pairs of optical waveguides le1, se1; le2, se2, and two pieces of 2-input/2-output optical couplers Ce1 and Ce2. The optical coupler Ce1 is provided at the pair of optical waveguides le1 and se1, and the optical coupler Ce2 is provided at the pair of optical waveguides le2 and se2. In FIG. 6, symbols c1 and c2 indicate input terminals of the optical coupler Ce1 or Ce2, while symbols d1 and d2 denote output terminals of the optical coupler Ce1 or Ce2. Each of the sixth optical waveguides se1 and se2 has its both ends exposed respectively to an outer end face 1'a and an inner end face 1'b of the first chip 1'.

The second optical component formed on a second chip 2' includes two pieces of optical waveguides sse1 and sse2 for transmitting monitoring light (hereinafter referred to as seventh optical waveguides). One ends of the seventh optical waveguides sse1 and sse2 are aligned with opposing exposed ends of the sixth optical waveguides se1 and se2 and exposed to an inner end face 2'a of the second chip 2'. The other ends of the seventh optical waveguides sse1 and sse2 are exposed to an outer end face 2'b of the second chip 2'.

A first block 3' holds two pieces of optical fibers Se1 and Se2 for transmitting monitoring light (hereinafter referred to as fifth optical fibers) together with the first and the third optical fibers Le1 and Le2 and S1 to S4. The fifth optical fibers Se1 and Se2 have their one ends exposed to an inner end face 3'a of the first block 3', while the other ends are connected to the testing device D. A second block 4' holds two pieces of optical fibers SSe1 and SSe2 (hereinafter referred to as sixth optical fibers) together with the second and fourth optical fibers L1 to L4 and SS1 to SS4. The sixth optical fibers SSe1 and SSe2 have their one ends exposed to an inner end face 4'a of the second block 4', while the other ends are connected to the testing device D.

Manufacture and assembly of the optical device of the second embodiment (FIG. 6) will be explained referring to FIG. 7 to FIG. 19. In FIGS. 6 to 19, the same optical device elements might be shown in different outside shape for the convenience of illustration.

Figure 7:
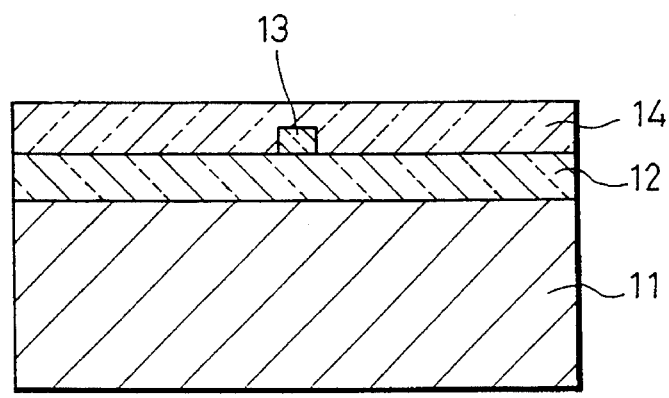
FIG. 7 is a sectional view of the first chip shown in FIG. 6.

For manufacture of the first chip 1', first, as shown in FIG. 7, a lower c lad layer 12 made of $SiO_2$ and a core layer made of $SiO_2$-$TiO_2$ are formed in sequence on a silicon single-crystal substrate 11 of a prescribed thickness, for example, 1 mm, by the flame hydrolysis deposition method. Then, a prescribed pattern of optical waveguides is formed in the core 13 by photo lithography and etching.

Figure 8:
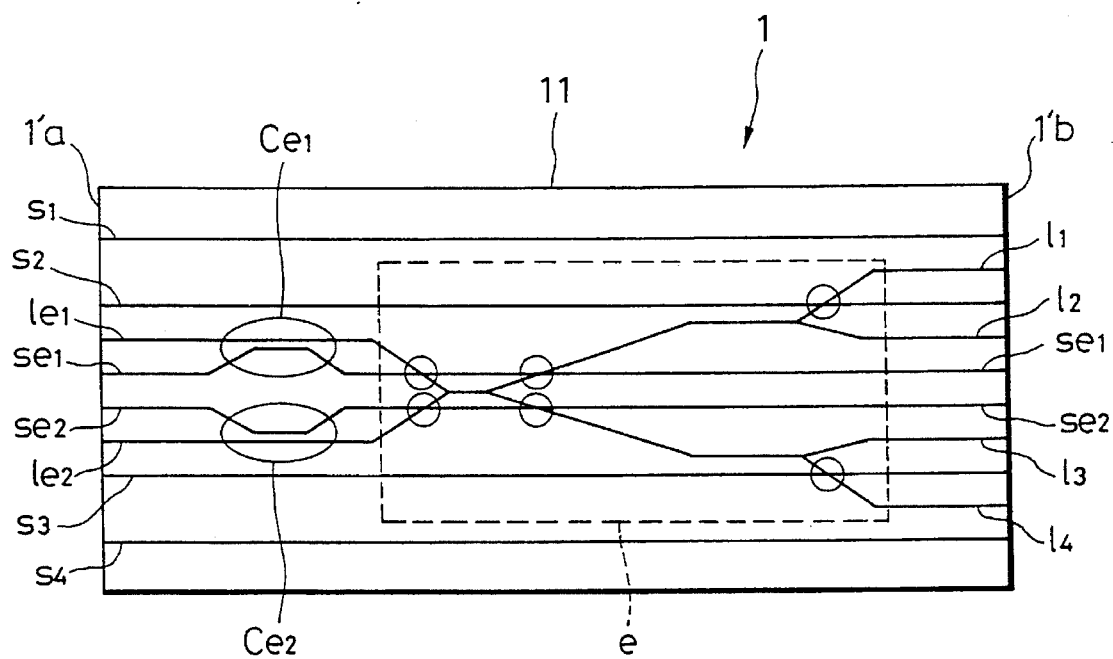
FIG. 8 is a schematic diagram showing an optical waveguide pattern of the core shown in FIG. 7.

As shown in FIG. 8, the optical waveguide pattern of the core 13 is constituted by a combination of a plurality of optical waveguides corresponding to various elements of the first optical component. For example, by combining a plurality of Y-branch waveguides, an optical waveguide pattern corresponding to a 2 ×4 star coupler e is obtained. Also, by arranging the first optical waveguides le1 and le2 in parallel with the sixth optical waveguides se1 and se2 to permit evanescent coupling to be established therebetween, an optical waveguide pattern corresponding to the optical couplers Ce1 and Ce2 (2 ×2 directional couplers) for fault search in the first optical fibers Le1 and Le2 are obtained. Moreover, the pattern shown in FIG. 8 includes optical waveguide intersection parts shown by circles in FIG. 8. At each of the intersections, optical waveguides cross each other at such a large angle that substantial loss or crosstalk will not occur. This intersection angle is set preferably at more than 10 degrees (20 degrees, for example).

Further, an upper clad layer 14 made of $SiO_2$ is formed by the flame hydrolysis deposition method on the silicon single-crystal substrate 11 with the core 13 having formed, to thereby obtain the first chip 1'.

Figure 9:
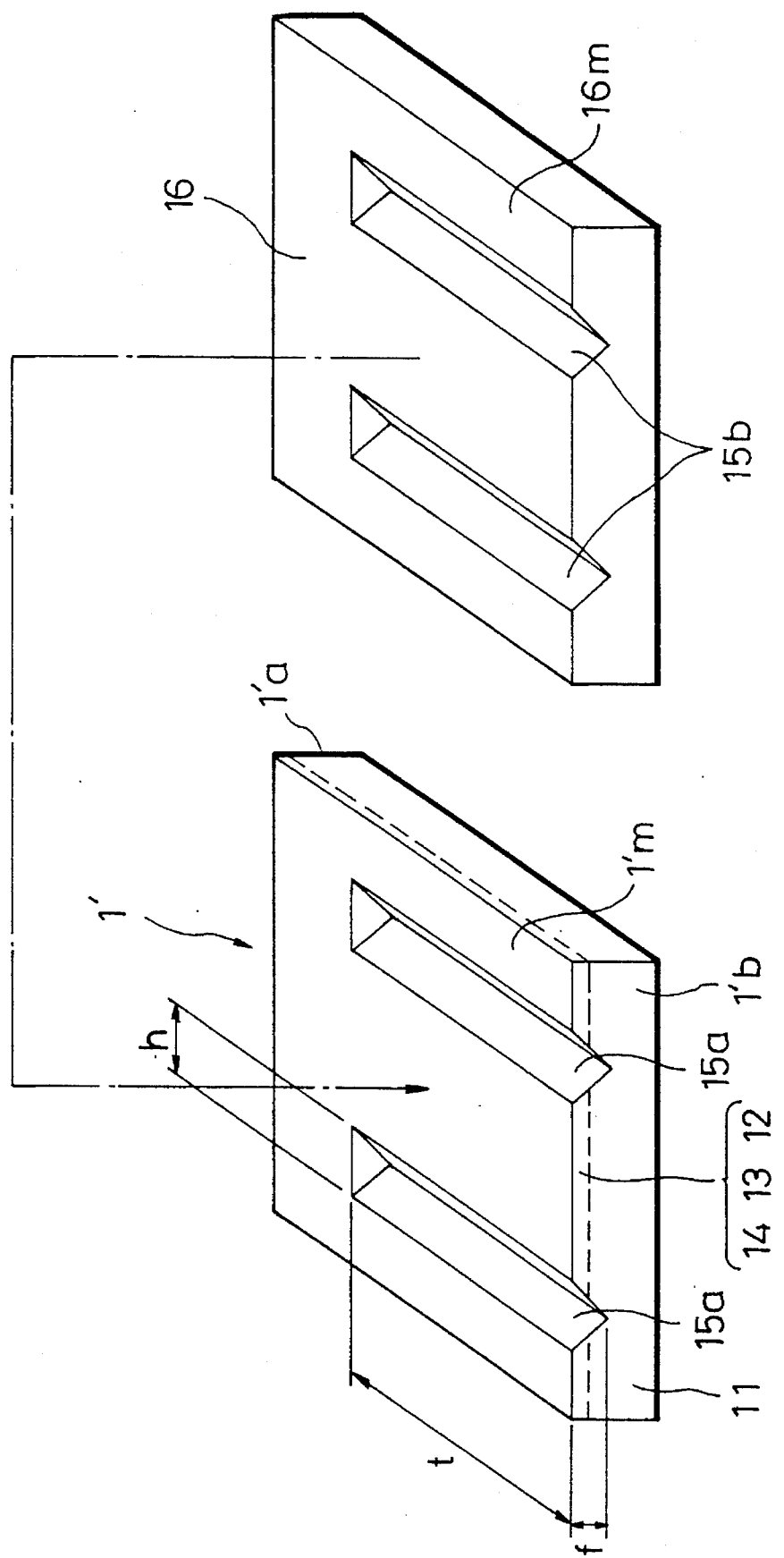
FIG. 9 is a perspective view showing the first chip and an upper plate in a state where V-grooves are formed in these elements.

Next, as shown in FIG. 9, two V-grooves 15a are formed on an upper face. 1'm of the first chip 1' (upper clad layer 14) using a slicer or the like. Each of the V-grooves 15a has a prescribed width h, depth f and length t, and extends perpendicularly to the inner end face 1'b of the first chip 1' with one end opening to the inner end face 1'b of the chip.

Figure 10:
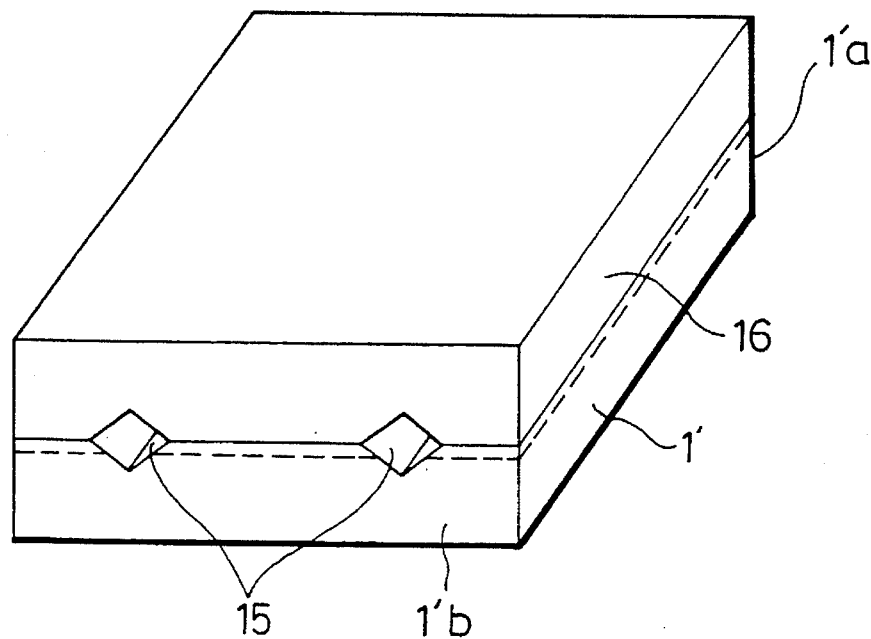
FIG. 10 is a perspective view showing the first chip and the upper plate shown in FIG. 9 in a state where these elements are glued together.

Moreover, on an top face 16m of an upper plate 16 made of silica glass or the like, two V-grooves 15b having the same shape as the V-grooves 15a are formed in alignment with the two V-grooves 15a. Then, the first chip 1' and the upper plate 16 are, as shown in FIG. 10, glued and fixed together at their opposing faces 1'm and 16m, with use of adhesive. In FIG. 10, reference numeral 15 indicates guide pin fitting holes formed by the V-grooves 15a and the V-grooves 15b. The upper plate 16 has a function to reinforce joint between the first chip 1' and the first block 3'.

Figure 11:
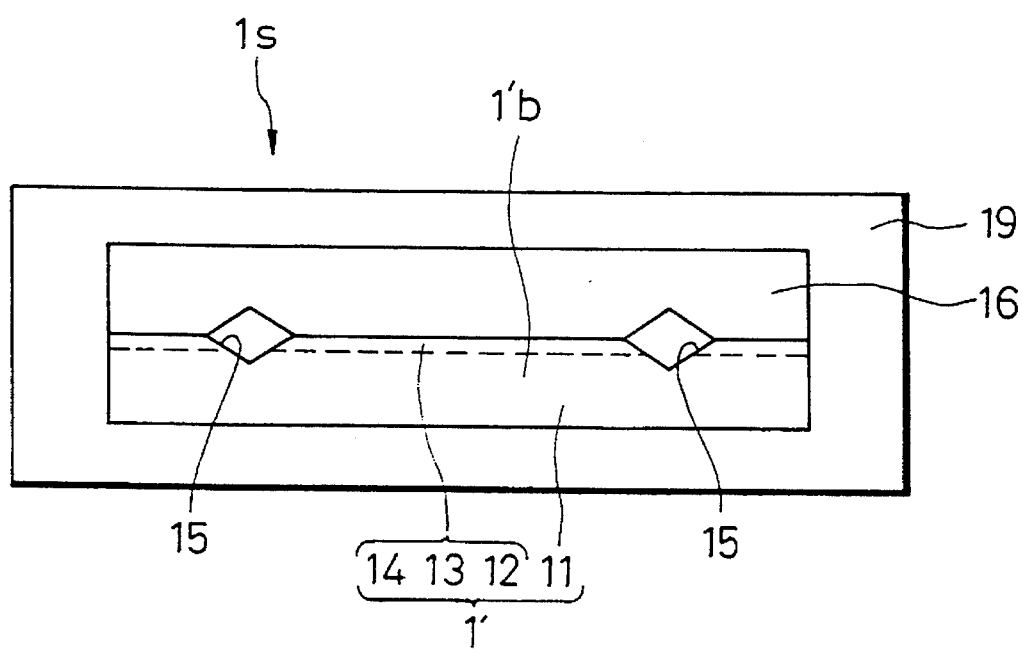
FIG. 11 is an end view showing a first mold chip obtained by coating an assembly of the first chip and the upper plate shown in FIG. 10 with a resin.

Next, as shown in FIG. 11, a peripheral surface of the first chip 1' excluding both end faces 1'a and 1'b is coated with a resin 19, whereby a first mold chip 1s is obtained. The both end faces of the first mold chip 1s is made flush with both the end faces 1'a and 1'b of the first chip 1'.

Examples of items of the first mold chip 1s will be shown in the following:

Thickness of lower clad layer : 20 μm

Cross sectional dimension of core: 8 μm × 8 μm

Difference in specific refraction rates between core/clad: 0.25%

Thickness of upper clad : 20 μm

Length of chip : 20 mm

Width of chip : 7 mm

Thickness of upper plate : 1 mm

Length of upper plate : 20 mm

Width of upper plate : 7 mm

Total thickness of molded chip : 3 mm

Total width of molded chip : 9 mm

Figure 12:
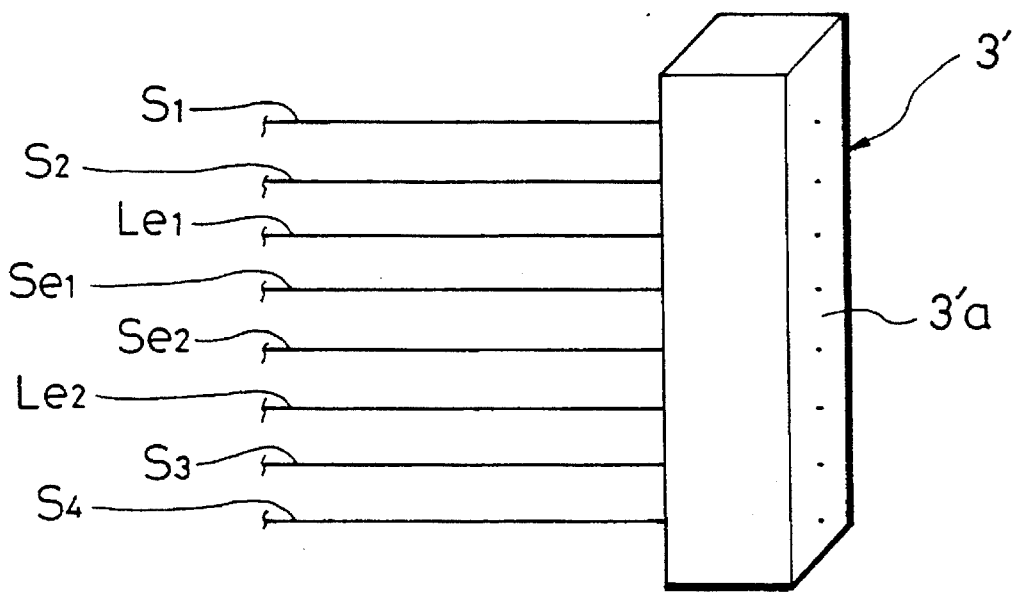
FIG. 12 is a perspective view showing the first block.

Next, in order to obtain the first block 3', eight pieces of optical fibers S1, S2, Le1, Se1, Se2, Le2, S3 and S4 disposed an interval of 250 μm are attached in this order to a ferrule made of a molded resin, as shown in FIG. 12. Then, a ferrule end face (inner end face of the first block) 3's is polished. Ends of the optical fibers S1 to S4, Le1, Le2, Se1 and Se2 are exposed to the block end face 3'a.

Figure 13:
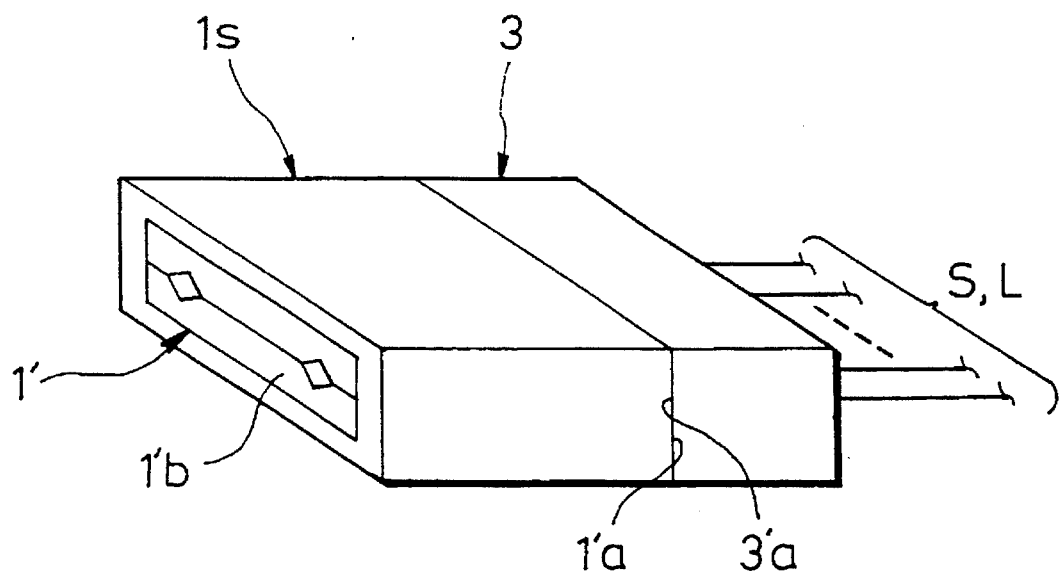
FIG. 13 is a perspective view showing the first block and the first mold chip in a state where these elements are joined together.

Next, as shown in FIG. 13, the inner end face 1'a of the first mold chip is caused to abut against the inner end face 3'a of the first block 3'. As a result, exposed ends of the optical fibers S1 to S4, Le1, Le2, Se1 and Se2 on the first block 3' side are aligned with the exposed ends of the optical waveguides s1 to s4, le1, le2, se1 and se2 on the first chip 1' side, respectively. If necessary, an adjustment to align the axis of the optical fibers with the axis of the cores of the optical waveguides is made. After that, the optical fibers S1 to S4, Le1, Le2, Se1 and Se2 are fixed to the first block 3' with an adhesive. The optical fibers S1 to S4, Se1 and Se2 for transmitting monitoring light are connected to the optical fiber line monitoring and testing device D, while the optical fibers Le1 and Le2 are connected to the optical communication terminal A in the optical office.

Figure 14:
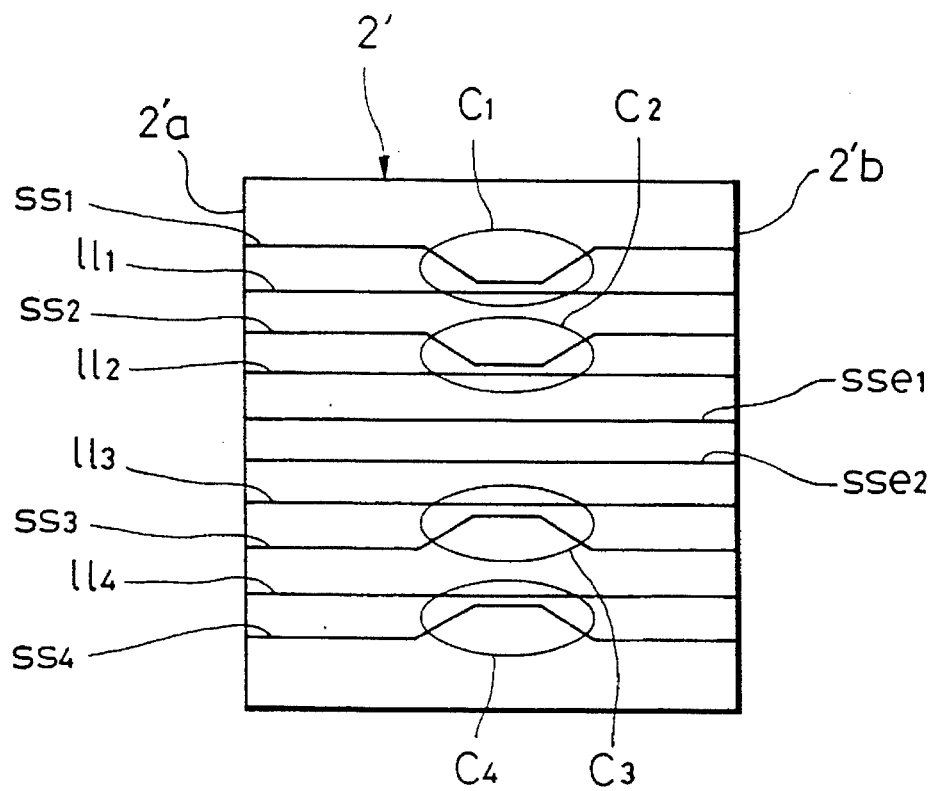
FIG. 14 is a schematic diagram showing a pattern of an optical waveguide formed on the second chip.
Figure 15:
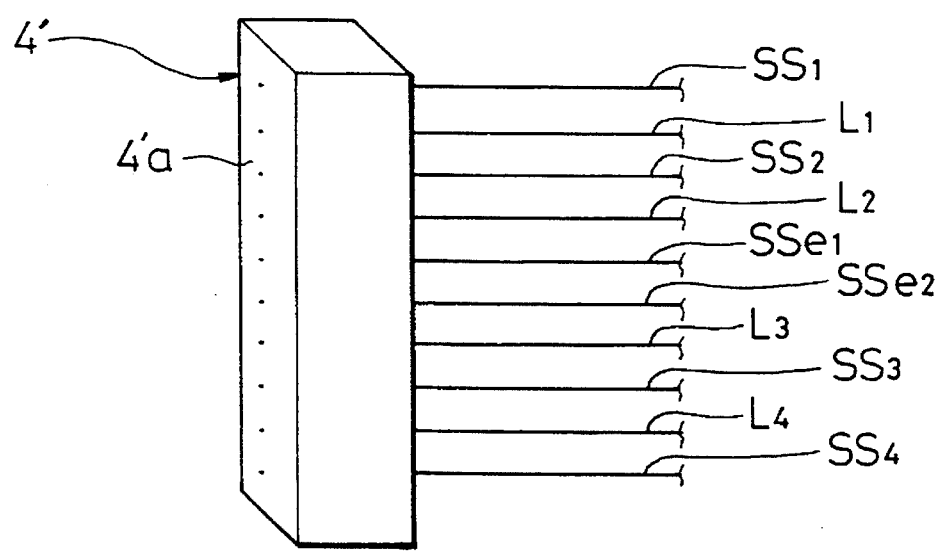
FIG. 15 is a perspective view showing the second block.

Next, a second mold chip 2s and a second block 4' are manufactured. The manufacturing process of the second mold chip 2s is the same as that for the first mold chip 1s, and the manufacturing process of the second block 4' is the same as that for the first block 3'. Hence, explanations on the manufacturing process will be omitted. FIG. 14 shows an optical waveguide pattern corresponding to the second optical component formed on the second chip 2'. Also, FIG. 15 shows the second block 4'. The second block 4' has ten pieces of optical fibers SS1 to SS4, L1 to L4, SSe1 and SSe2 which are disposed at an interval of 250 μm, and which have their ends exposed to an inner end face 4'a of the second block 4'. The optical fibers SS1 to SS4, SSe1 and SSe2 for transmitting monitoring light are connected to the optical fiber line monitoring and testing device D, while the optical fibers L1 to L4 for transmitting communication light are connected to the optical communication terminals B on the subscriber side.

Figure 16:
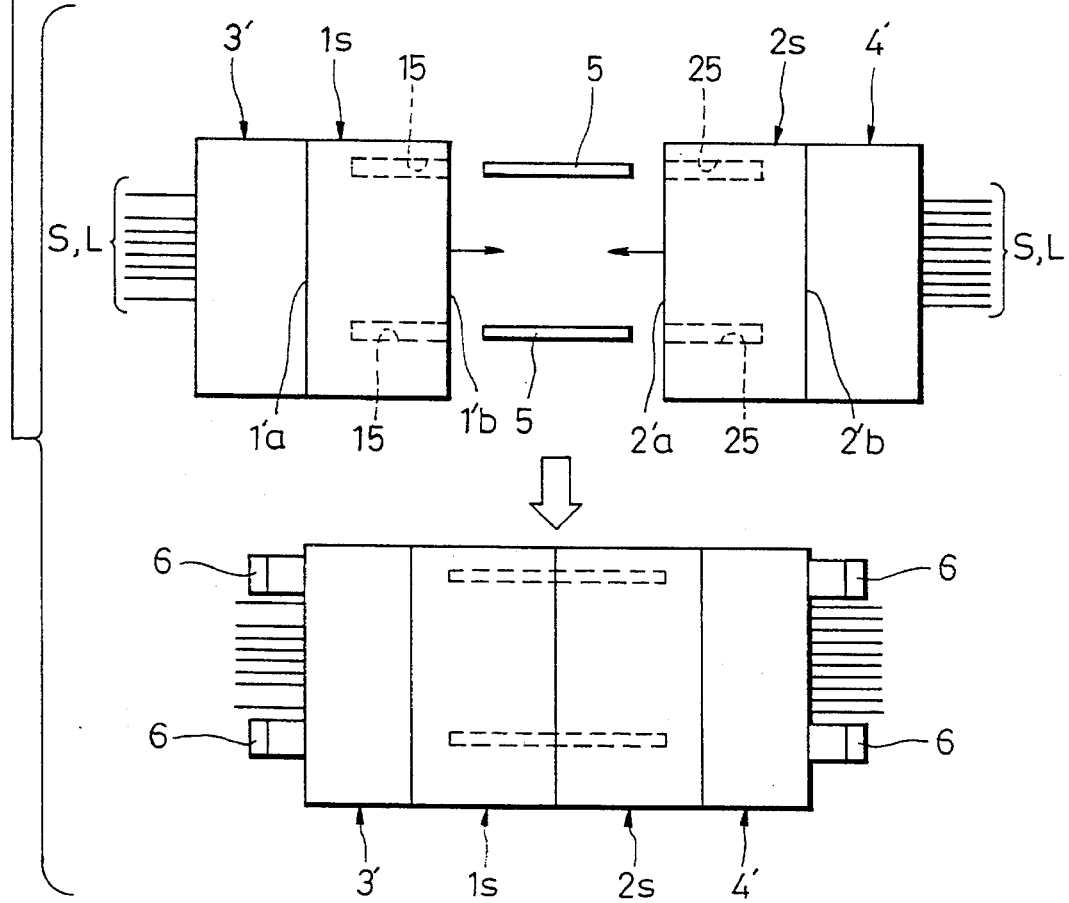
FIG. 16 is a plan view showing a final stage of assembly of the composite optical device of the second embodiment of the present invention.
Figure 17:
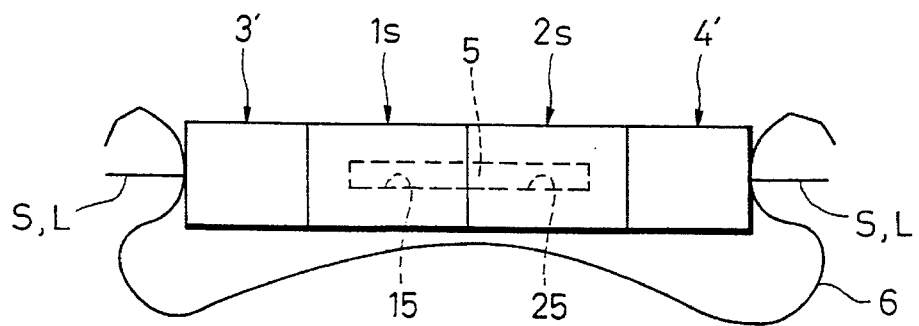
FIG. 17 is a side view of the assembled composite optical device shown in FIG. 16.

Then, as shown in FIG. 16, one end portions of guide pins 5 are inserted into guide pin fitting holes 15 provided at the inner end face 1'b of the first mold chip 1s, and the other end portions of the guide pins 5 are inserted into two guide pin fitting holes 25 provided at the inner end face 2'a of the second mold chip 2s. The first mold chip 1s to which the first block 3' is attached and the second mold chip 2s to which the second block 4' is attached are made to abut against each other at the opposing end faces 1'b and 2'a of both the chips. Moreover, as shown in FIG. 17, the first block 3', the first mold chip 1s, the second mold chip 2s and the second block 4' are fixed by clamping with a clamp member 6. In this manner, the composite optical device shown in FIG. 6 is obtained.

When the first block 3' holding the first, third and fifth optical fibers Le1, Le2, S1 to S4, Se1 and Se2 is joined to the first mold chip 1s,(first chip 1'), one ends of the first optical fibers Le1 and Le2 are aligned with the opposing exposed ends of the first optical waveguides le1 and le2, one ends of the third optical fibers S1 to S4 with the opposing exposed ends of the fourth optical waveguides s1 to s4, and one ends of the fifth optical fibers Se1 and Se2 with the opposing exposed ends of the sixth optical waveguides se1 and se2, respectively. Moreover, when the second block 4' holding the second, fourth and sixth optical fibers L1 to L4, SS1 to SS4, SSe1 and SSe2 is joined to the second mold chip 2s (second chip 2'), one ends of the second optical fibers L1 to L4 are aligned with the opposing exposed ends of the third optical waveguides ll1 to ll4, one ends of the fourth optical fibers SS1 to SS4 with the opposing exposed ends of the fifth optical waveguides ss1 to ss4, and one ends of the sixth optical fibers SSe1 and SSe2 with the opposing exposed ends of the seventh optical waveguides sse1 and sse2. Furthermore, when the first mold chip 1s is joined to the second mold chip 2s, the corresponding opposing exposed ends of the second and the third optical waveguides l1 to l4; ll1 to ll4 are aligned with one another, the cot responding opposing ends of the fourth and the fifth optical waveguides s1 to s4; ss1 to ss4 with one another, and the corresponding opposing ends of the sixth and the seventh optical waveguides se1, se2; sse1 and sse2 with one another.

Figure 5:
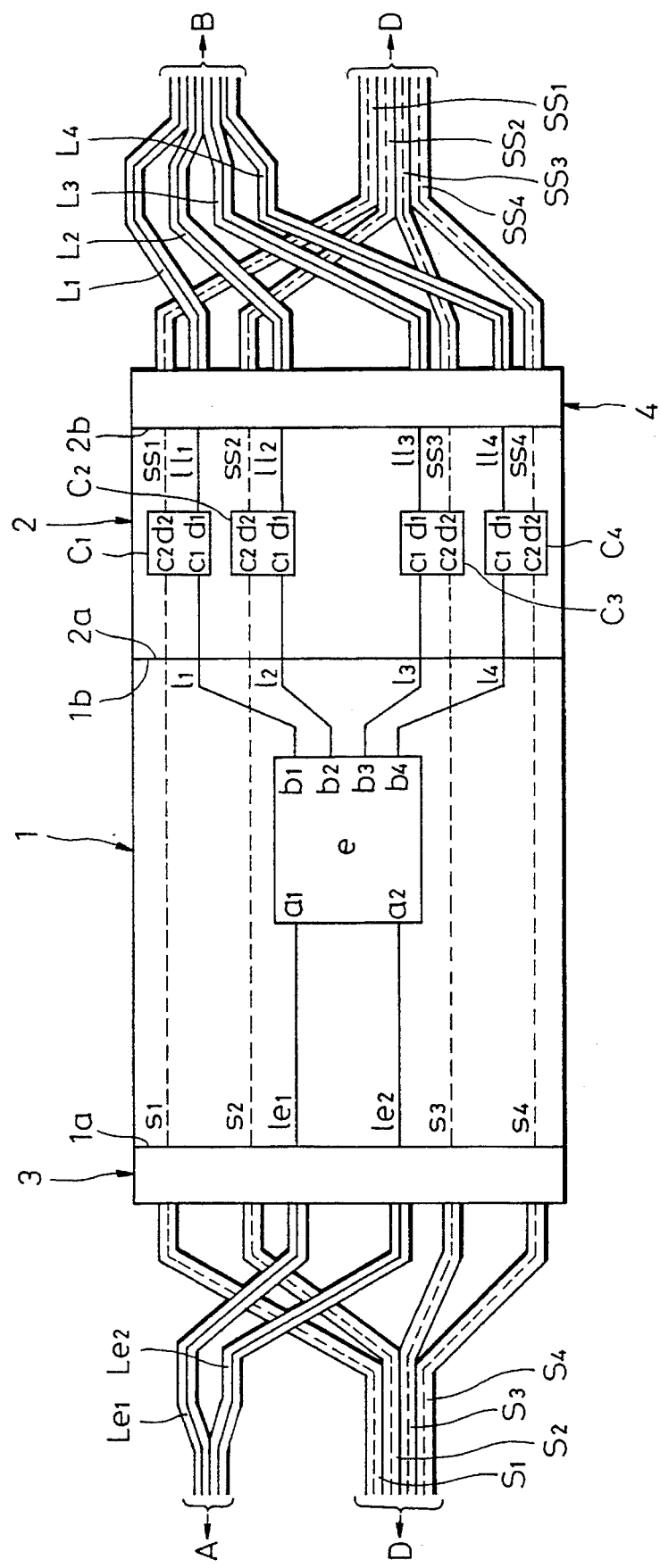
FIG. 5 is a schematic plan view showing a composite optical device according to a first embodiment of the present invention.

Operation of the optical device according to the second embodiment obtained in this way (FIG. 6) is basically the same as that of the device of the first embodiment (FIG. 5). Thus, explanations on the fault searching function for the second optical fibers on the subscriber side and the communication light transmitting function of the optical device according to the second embodiment will be omitted.

In the following, an operation of the composite optical device of the second embodiment relating to fault search in the first optical fibers on the office side will be explained.

When the monitoring light λ2 enters the sixth optical waveguide se1 or se2, the monitoring light λ2 propagates from this sixth optical waveguide to the first optical waveguide le1 or le2 through the optical coupler Ce1 or Ce2, and further to the first optical fiber Le1 or Le2, so that a fault is searched in the first optical fiber.

Figure 6:
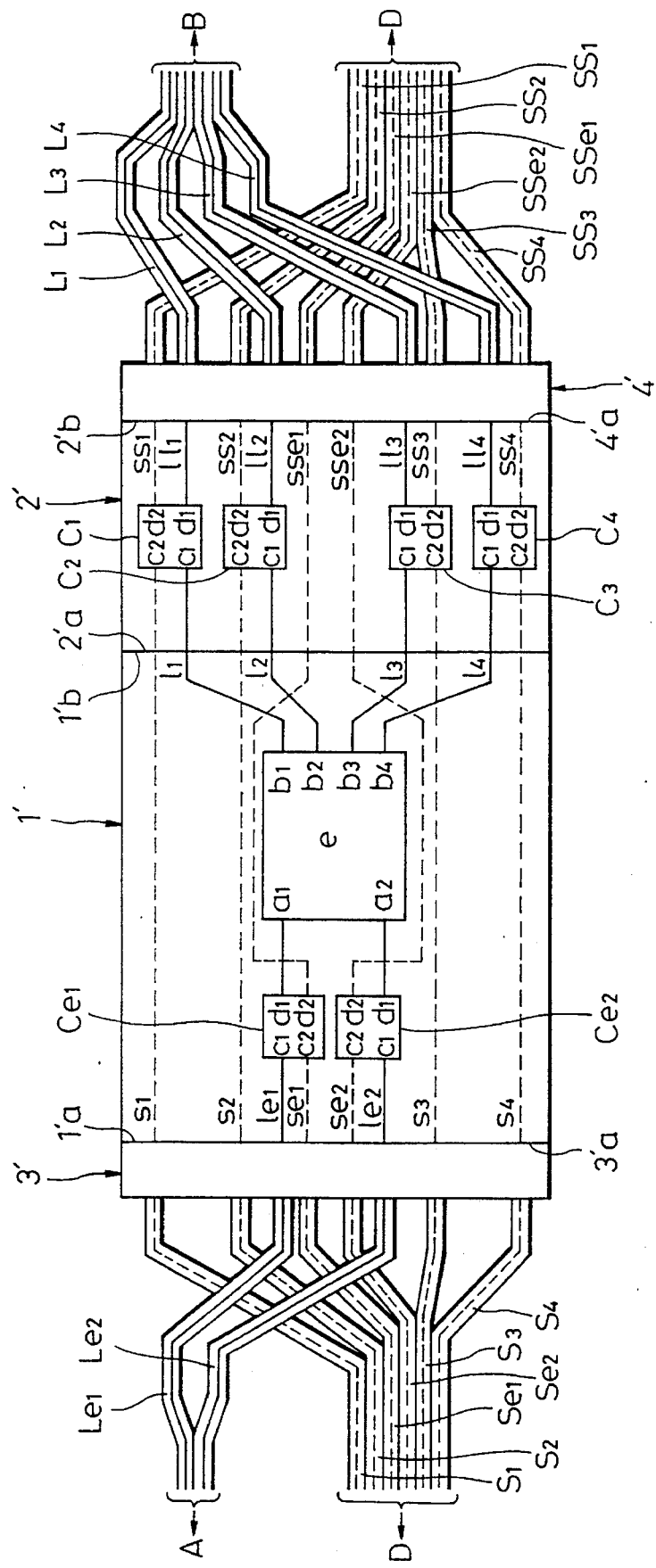
FIG. 6 is a schematic plan view showing a composite optical device according to a second embodiment of the present invention.

As explained above, by incorporating the composite optical device shown in FIG. 6 into the optical fiber communication system, a passive double star system provided with an optical fiber line monitoring function (fault search function) can be obtained.

Figure 18:
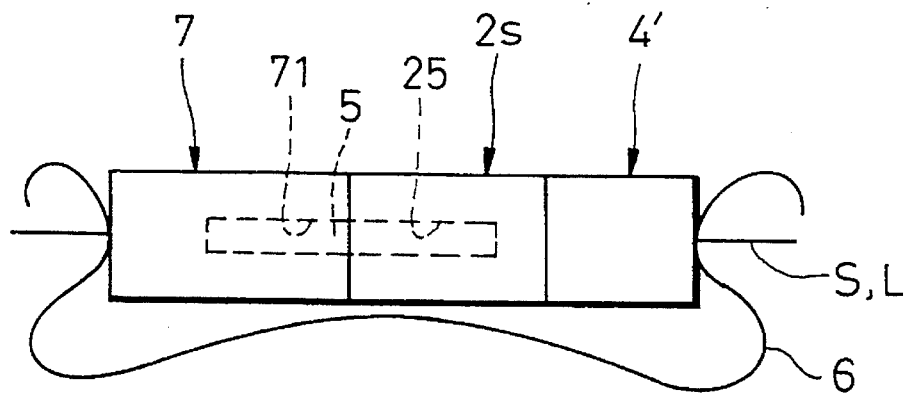
FIG. 18 is a side view showing the composite optical device of the second embodiment of the present invention applied to the single star system.
Figure 19:
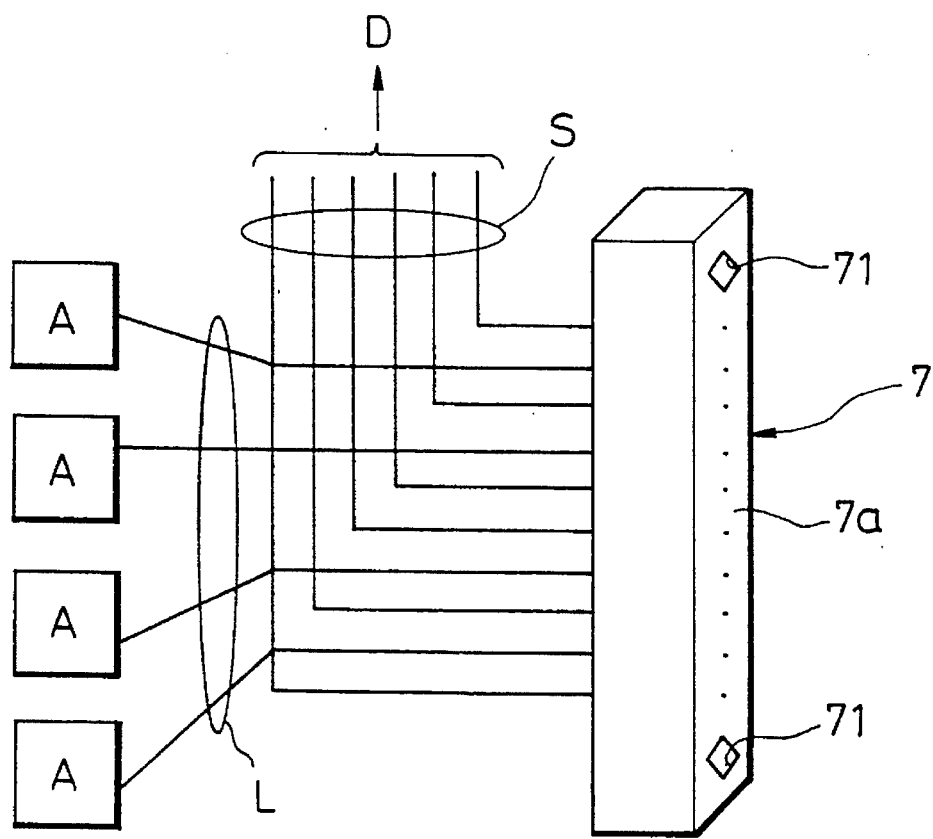
FIG. 19 is a schematic perspective view showing the MT connector shown in FIG. 18.

Also, the composite optical device of this embodiment can also be applied to the single star system. When a single star system is to be constructed, an MT connector 7 shown in FIGS. 18 and 19 is used instead of the first mold chip 1s to which the first block 3' is attached. The MT connector 7 holds optical fibers L for transmitting communication light connected to the office equipment A, and optical fibers S for transmitting monitoring light respectively connected to the optical fiber line monitoring and testing device D. For example, the MT connector 7 holds four optical fibers L and six optical fibers S in a case where four pieces (which is the same as the number of the subscribers' terminals B) of the office equipment A are installed. The MT connector 7 is formed with guide pin fitting holes 71 in alignment with the guide pin fitting holes 25 of the second mold chip 2s.

When a single star system is to be constructed after construction of the passive double star system using the composite optical system in FIG. 6, the clamp member 6 is taken out of the first and second mold chips 1s and 2s and the first and second blocks 3' and 4'. Then, the first mold chip 1s to which the first block 3' is attached is removed from the second mold chip 2s to which the second block 4' is attached. Next, the MT connector is joined to the second mold chip 2s, and, the MT connector 7, the second mold chip 2s and the second block 4' are clamped using the clamp member 6. By doing this, a single star system provided with a fault search function is constructed.

In the composite optical device of the second embodiment, the second optical fibers L1 to L4 for transmitting communication light and the fourth and sixth optical fibers SS1 to SS4, SSe1 and SSe2 for transmitting monitoring light are formed into a tape.

Figure 20:
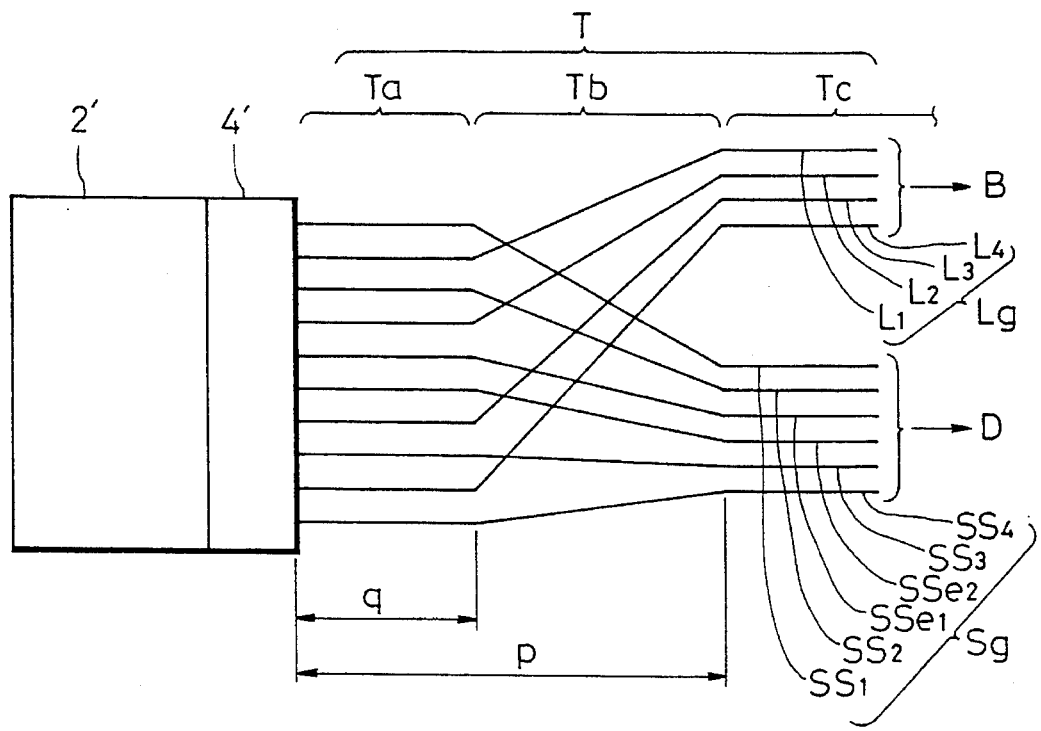
FIG. 20 is a plan view showing an optical fiber tape connected to the second block in the composite optical device shown in FIG. 6.

More specifically, within the range shown by symbol p in FIG. 20, the second, fourth and sixth optical fibers L1 to L4; SS1 to SS4; SSe1 and SSe2 are made into a single conductor cable and separated from one another. Within the range shown by symbol q, the optical fibers L1 and L2 and the optical fibers SS1, SS2 and SSe1 are arranged alternately, and the optical fibers L3 and L4 and the optical fibers SSe2, SS3 and SS4 are arranged alternately. End portions of a group of optical fibers arranged in the order of SS1, L1, SS2, L2, SSe1, SSe2, L3, SS3, L4 and SS4 in the range i are formed into a tape, whereby a tape part Ta is formed. In the meantime, outside the range p, the second optical fibers L1 to L4 are bundled together as one multi-conductor cable Lg, and the fourth and sixth optical fibers SS1 to SS4, SSe1 and SSe2 are also bundled together as one multi-conductor cable Sg, whereby a tape part Tc is formed. Between the tape part Ta and the tape part Tc, corresponding ones of the second, fourth and sixth optical fibers cross one another to form an intersection part Tb which is formed into a tape.

As mentioned above, the second, fourth and sixth optical fibers, which consist of three parts of the tape part Ta, the intersection part Tb and the tape part Tc, constitute, as a whole, an optical fiber tape T. The tape part Ta is connected en bloc to the second block 4', one group of optical fibers Lg of the tape part Tc is connected en bloc to the subscriber's terminal B side, and the other group of optical fibers Sg of the tape part Tc is connected en bloc to the optical fiber line monitoring and testing device D. Thus, workability in connecting the optical fiber tape T to the second block 4' and the final destination can be improved.

In the following, a composite optical device according to a third embodiment of the present invention will be explained.

The composite optical device of this embodiment intends rapid assembly and disassembly of the composite optical device, and hence rapid switching between the single star system and the double star system, by arranging the guide pins 5 used for assembly of the device such that they are permitted to be inserted and removed from the outer end face sides of the first and the second blocks 3' and 4'.

Figure 21:
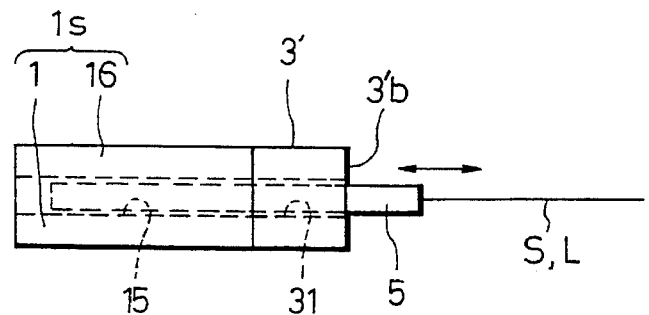
FIG. 21 is a schematic side view showing an assembling process using a guide pin in the composite optical device of a third embodiment of the present invention.

Referring to FIG. 21, unlike the first chip 1' and the upper plate 16 shown in FIG. 9, V-grooves (corresponding to the V-grooves 15a and 15b in FIG. 9) are formed on the first chip 1' and the upper plate 16 over the entire axial length of these elements 1 and 16, whereby the first mold chip 1s constituted by the elements 1' and 16 is formed with the guide pin fitting holes 15 axially extending therethrough. Moreover, through holes 31 into which the guide pins 5 are inserted are formed in alignment with the pin fitting holes 15 of the first mold chip 1s, using a drill or the like. As a result, the guide pins 5 can be inserted and removed from the outer end face 3'b side of the first block 3'.

Although illustration is omitted, the second mold chip is also for med with guide pin fitting holes extending therethrough, an d the second block is formed with through holes corresponding to the through holes 31. Thus, the guide pin 5 can be inserted and removed from the outer end face side of the second block.

According to the above constitution, using an instantaneous switching device used in an optical CATS (Cable Transfer Splicing System), the composite optical device can be changed in a short period of time less than several tens of mill-seconds from one adapted for a passive double star system shown in FIG. 17 to one adapted for a single star system shown in FIG. 18.

More specifically, in changing an optical communication system using the instantaneous switching device, first, the clamp 6 is removed from the composite optical device shown in FIG. 17. Then, the guide pins 5 inserted into the guide pin fitting holes of the first and second mold chips 1s and the through holes of the second block 4' are removed at high speed from the outer end face side of the second block 4', whereby the first mold chip 1s is separated from the second mold chip 2s. Next, the second mold chip 2s is moved to the MT connector 7 side at high speed, and the MT connector 7 and the second mold chip 2s are joined to each other at their opposing end faces 7a and 2'a. Moreover, from the outer end face side of the second block 4', the guide pins 5 are inserted at high speed into the through holes of the second block 4', the guide pin fitting holes of the second mold chip 2s and the guide pin fitting holes 71 of the MT connector 7. By doing this, the MT connector 7, the second mold chip 2s and the second block 4' are positioned accurately. Finally, the MT connector 7, the second mold chip 2s and the second block 4' are clamped and fixed to one another by the clamp member 6. In this way, switching from the passive double star system to the single star system can be done rapidly.

Next, a composite optical device according to a fourth embodiment of the present invention will be explained.

The composite optical device of this embodiment intends rapid assembly and disassembly of the composite optical device and hence rapid switching between the optical communication systems by arranging the guide pins 5 so as to be inserted and removed from between the first block 3' and the first mold chip 1s and between the second block 4' and the second mold chip 2s.

Figure 22:
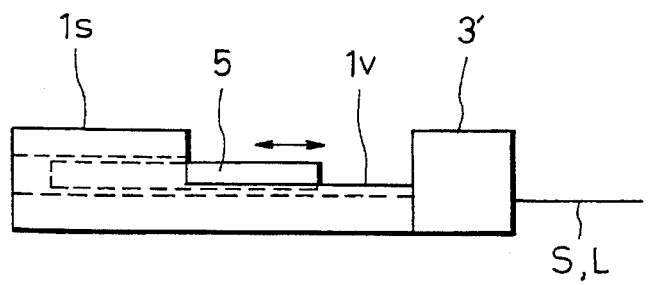
FIG. 22 is a schematic side view showing an assembling process using a guide pin in the composite optical device of a fourth embodiment of the present invention.

Referring to FIG. 22, recesses 1v are formed on the top face of the half on the first block 3' side of the first mold chip 1s. A dicing saw or the like is used to form the recesses 1v. The axial length of each recess 1v is made longer than the entire length of the guide pin 5, whereby the guide pins 5 can be freely inserted and removed from the recesses 1v. The same recesses are also formed on the second mold chip 2s.

According to this constitution, as with the case of the third embodiment, the optical communication system can be switched rapidly using the instantaneous switching device.

The present invention is not limited to the first to the fourth embodiments, but can have many variations.

For example, in the first and the second embodiments, the case has been explained where the present invention is applied to the optical communication system transmitting communication light from four pieces of office equipment to four subscribers terminals, but more generally, the present invention is applicable to the optical communication system for one-way communication or two-way communication between M pieces of office equipment and N pieces of subscribers' terminals. In this case, an M×N optical coupler is used instead of the 2×4 star coupler e.

In the optical device of the first embodiment, as with the case of the second embodiment, guide pin fitting holes can be provided on the inner end faces 1b and 2a of the first and the second chips, so that these two chips can be joined together using the guide pins. Also, a connector similar to the MT connector 7 shown in FIGS. 18 and 19 can be used to construct a single star system.

In the second embodiment, the star coupler e obtained by combining a plurality of Y branch waveguides have been used as optical coupler means for optical coupling corresponding ones of the first and second optical waveguides, but instead of this, a directional coupler or a wavelength flat coupler as an asymmetrical Mach-Zehnder interferometer (WING (Wavelength Insensitive Coupler)) can be employed.

Also, in the second embodiment, the 2×2 directional couplers C1 to C4; Gc1 and Cc2 have been used as four-terminal optical coupler (2×2 coupler) for optically coupling the third and fifth optical waveguides and for optically coupling the first and sixth optical waveguides, but instead of them, wavelength division multiplexing (WDM) couplers or wavelength flat couplers such as WING can be also used.

What is claimed is:

1. A composite optical device comprising:

a first chip having an inner end face and an outer end face, said first chip being formed, in an integrated form, with a first optical component which includes M pieces of first optical waveguides for transmitting communication light, N pieces (N>M) of second optical waveguides for transmitting communication light, and a first optical coupler means for optically coupling corresponding ones of said first and second optical waveguides, each of said first optical waveguides having a first end exposed to said outer end face of said first chip, each of said second optical waveguides having a first end exposed to said inner end face of said first chip; and a second chip having an inner end face and an outer end face, said first and second chips being separate from each other and adapted to be removably joined to each other at said inner end faces of said first and second chips, said second chip being formed, in an integrated form, with a second optical component which includes N pieces of third optical waveguides for transmitting communication each of said third optical waveguides having a first end. exposed to said inner end face of said second chip, corresponding ones of said first ends of said second optical waveguides and said first ends of said third optical waveguides being aligned with each other when said first chip and said second chip are joined to each other.

2. A composite optical device according to claim herein said first optical component includes N pieces of fourth optical waveguides for transmitting monitoring light, each of said fourth optical waveguides having a first end exposed to said inner end face of said first chip and a second end exposed to said outer end face of said first chip;

said second optical component includes N pieces of fifth optical waveguides for transmitting monitoring light, and a second optical coupler means for optically coupling corresponding ones of said third optical waveguides and said fifth optical waveguides, each of said fifth optical waveguides having a first end exposed to said inner end face of said second chip; and corresponding ones of said first ends of said fourth optical waveguides and said first ends of the fifth optical waveguides are aligned with each other when said first chip and said second chip are joined to each other.

3. A composite optical device according to claim 1 further including:

a first block for holding M pieces of first optical fibers for transmitting communication light in a state where one ends of the first optical fibers are exposed to the inner end face of the first block; and a second block holding N pieces of second optical fibers for transmitting communication light in a state where one ends of the second optical fibers are exposed to the inner end face of the second block, wherein said first block is removably joined at its inner end face to said outer end fade of said first chip;

said second block is removably joined at its inner end face to said outer end face of said second chip;

each of said third optical waveguides has a second end exposed to said outer end face of said second chip;

said one end of each of said first optical fibers is aligned with a corresponding one of said first ends of said first optical waveguides when said first block holding said M pieces of first optical fibers is joined to said first chip; and said one end of each of said second optical fibers is aligned with a corresponding one of said second ends of said third optical waveguides when said second block holding said N pieces of second optical fibers is joined to said second chip.

4. A composite optical device according to claim 3 further including:

a clamp means for removably clamping said first block, said first chip, said second chip and said second block which are joined to one another.

5. A composite optical device according to claim 2 further including:

a first block for holding M pieces of first optical fibers for transmitting communication light, and N pieces of third optical fibers for transmitting monitoring light in a state where one ends of the first and third optical fibers are exposed to said inner end face of said first block; and a second block for holding N pieces of second optical fibers for transmitting communication light and N pieces of fourth optical fibers for transmitting monitoring light in a state where one ends of the second and fourth optical fibers are exposed to the inner end face of the second block, wherein said first block is removably joined at its inner end face to said outer end face of said first chip;

said second block is removably joined at its inner end face to said outer end face of said second chip;

each of said third and fifth optical waveguides has a second end exposed to said outer end face of said second chip;

said one end of each of said first optical fibers is aligned with a corresponding one of said first ends of said first optical waveguides and said one end of each of said third optical fibers is aligned with a corresponding one of said second ends of said fourth optical waveguides when said first block holding said M pieces of first optical fibers and said N pieces of third optical fibers is joined to said first chip; and said one end of each of said second optical fibers is aligned with a corresponding one of said second ends of said third optical waveguides and said one end of each of said fourth optical fibers is aligned with a corresponding one of said second ends of said fifth optical waveguides when said second block holding said N pieces of second optical fibers and said N pieces of fourth optical fibers is joined to said second chip.

6. A composite optical device according to claim 5 further including:

a clamp means for removably clamping said first block, said first chip, said second chip and said second block which are joined to one another.

7. A composite optical device according to claim wherein said first optical coupler means includes a star coupler having M pieces of first terminals, and N pieces of second terminals;

each of said first optical waveguides has a second end connected to a corresponding one of said first terminals of said star coupler; and each of said second optical waveguides has a second end connected to a corresponding one of said second terminals of said star coupler.

8. A composite optical device according to claim 1, wherein each of said third optical waveguides cooperates with a corresponding one of said fifth optical waveguides to constitute a pair of optical waveguides;

said second optical coupler means include N pieces of four-terminal optical couplers; and each of said four-terminal optical couplers is provided at a corresponding one of said pairs of optical waveguides, for optically coupling the third optical waveguide and the fifth optical waveguide which constitute the corresponding one pair of optical waveguides.

9. A composite optical device according to claim 2, further including:

M pieces of sixth optical waveguides for transmitting monitoring light; and third optical coupler means for optically coupling corresponding ones of said first optical waveguides and said sixth optical waveguides, wherein each of said sixth optical waveguides has a first end exposed to said outer end face of the first chip.

10. A composite optical device according to claim 9, wherein said M pieces of sixth optical waveguides for transmitting monitoring light cooperate with said M pieces of first optical waveguides to constitute M pairs of optical waveguides;

said third optical coupler means include M pieces of four-terminal optical couplers; and each of said four-terminal optical coupler is provided at a corresponding one of said pairs of optical waveguides for optically coupling the first waveguide and the sixth optical waveguide which constitute the corresponding one pair of optical waveguides.

11. A composite optical device according to claim 10, wherein each of said sixth optical waveguides has a second end exposed to said inner end face of said first chip;

said second optical component includes M pieces of seventh optical waveguides for transmitting monitoring light; and each of said seventh optical waveguides has a first end exposed to said inner end face of said second chip alignment with a corresponding one of said second ends of said sixth optical waveguides, and a second end exposed to said outer end face of said second chip.

12. A composite optical device according to claim further including:

a first block for holding M pieces of first optical fibers for transmitting communication light, N pieces of third optical fibers for transmitting monitoring light and M pieces of fifth optical fibers for transmitting monitoring light in a state where one ends of said first, third and fifth optical fibers are exposed to the inner end face of the first block; and a second block for holding N pieces of second optical fibers for transmitting communication light, N pieces of fourth optical fibers for transmitting monitoring light and M pieces of sixth optical fibers for transmitting monitoring light in a state where one ends of said second, fourth and sixth optical fibers are exposed to the inner end face of the second block, wherein s aid first block is removably joined at its inner end face to said outer end face of said first chip;

said second block is removably joined at its inner end face to said outer end face of said second chip;

each of said third and fifth optical waveguides has second end exposed to said outer end face of said second chip;

said one end of each of said first optical fibers is aligned with a corresponding one of said first ends of said first optical waveguides, said one end of each of said third optical fibers is aligned with a corresponding one of said second ends of said fourth optical waveguides and said one end of each of said fifth optical fibers is aligned with a corresponding one of said first ends of said sixth optical waveguides when said first block holding said M pieces of first optical fibers, said N pieces of third optical fibers and said M pieces of fifth optical fibers is joined to said first chip; and said one end of each of said second optical fibers is aligned with a corresponding one of said second ends of said third optical waveguides, said one end of each of said fourth optical fibers is aligned with a corresponding one of said second ends of said fifth optical waveguides, and said one end of each of said sixth optical fibers is aligned with a corresponding one of said second ends of said seventh optical waveguides when said second block holding said N pieces of second optical fibers, said N pieces of fourth optical fibers and said M pieces of sixth optical fibers is joined to said second chip.

13. A composite optical device according to claim 12 further including:

a clamp means for removably clamping said first block, said first chip, said second chip and said second block which are joined to one another.

14. A composite optical device according to claim further including:

a guide pin for joining said first chip to said second chip, wherein said first chip is formed with a first guide hole which opens to said inner end face and to which said guide pin is removably fitted; and said second chip is formed with a second guide hole in alignment with said first guide hole, said second guide hole opening to said inner end face, said guide pin being removably fitted to said second guide hole.

15. A composite optical device according to claim 3 further including:

a guide pin for joining said first chip to said second chip, wherein said first chip is formed with a first guide hole which extends therethrough and to which said guide pin is removably fitted;

said second chip formed with a second guide hole extending therethrough in alignment with said first guide hole, said guide pin being removably fitted to said second guide hole; and said first block is formed with a third guide hole extending therethrough in alignment with said first guide hole, said guide pin is removably fitted to said third guide hole; and said second block is formed with a fourth guide hole extending therethrough in alignment with said second guide hole, said guide pin being removably fitted to said fourth guide hole.

* * * * *